US006972603B2

(12) United States Patent
Mochizuki et al.

(10) Patent No.: US 6,972,603 B2
(45) Date of Patent: Dec. 6, 2005

(54) MAXIMUM TIME INTERVAL ERROR TEST SIGNAL GENERATING APPARATUS NOT AFFECTED BY LOW-PASS MEASURING FILTER

(75) Inventors: Ken Mochizuki, Atsugi (JP); Osamu Sugiyama, Zama (JP)

(73) Assignee: Anritsu Corporation, Tokyo (JP)

( * ) Notice: Subject to any disclaimer, the term of this patent is extended or adjusted under 35 U.S.C. 154(b) by 212 days.

(21) Appl. No.: 10/680,975

(22) Filed: Oct. 7, 2003

(65) Prior Publication Data

US 2004/0088620 A1   May 6, 2004

(30) Foreign Application Priority Data

Oct. 17, 2002   (JP)   ............................. 2002-303552

(51) Int. Cl.[7] .............................................. H03L 7/00
(52) U.S. Cl. ..................................................... 327/155
(58) Field of Search ............................... 363/148, 149, 363/156; 327/105, 155, 161, 162, 291, 292, 327/295, 299, 306, 309, 322

(56) References Cited

U.S. PATENT DOCUMENTS

| | | | |
|---|---|---|---|
| 6,184,810 B1 * | 2/2001 | Burns ......................... | 341/143 |
| 6,246,738 B1 | 6/2001 | Acimovie et al. | |
| 6,658,612 B1 * | 12/2003 | Park et al. .................. | 714/724 |
| 6,768,360 B2 * | 7/2004 | Tsuruki ...................... | 327/158 |
| 6,798,830 B1 * | 9/2004 | Tharakan .................... | 375/224 |
| 2001/0044701 A1 | 11/2001 | Ballantyne et al. | |

FOREIGN PATENT DOCUMENTS

EP   1 152 562 A1   11/2001

OTHER PUBLICATIONS

ITU-T G.812; Telecommunication Standardization Section of ITU; Series G: Transmission Systems and Media, Digital Systems and Networks; Jun. 1998.
ITU-T O.172; Telecommunication Standardization Section of ITU; Series O: Specifications of Measuring Equipment; Mar. 2001.
ITU-T O.172; Telecommunication Standardization Section of ITU; Series O: Specifications of Measuring Equipment; Mar. 2003.

* cited by examiner

*Primary Examiner*—Matthew V. Nguyen
(74) *Attorney, Agent, or Firm*—Frishauf, Holtz, Goodman & Chick, P.C.

(57) ABSTRACT

An MTIE test signal generating apparatus generates a predetermined MTIE test signal. An MTIE measuring unit includes a low-pass measuring filter having a predetermined high-cut characteristic. A cycle-amplitude setting portion sets a cycle corresponding to an observation time of each of desired plural specific points for a predetermined MTIE characteristic and an amplitude corresponding to a difference in the MTIE value between adjacent specific points. Plural signal generating portions generate plural signals each having the cycle and the amplitude having repetitive waveforms and then outputting to each of the desired plural specific points. A holding time setting portion sets a holding time for holding the upper and lower limit values of the repetitive waveforms over the predetermined time so that a signal cycle having at least the shortest cycle of the plural signals is longer than a predetermined time corresponding to the predetermined high-cut characteristic of the low-pass measuring filter.

20 Claims, 8 Drawing Sheets

MAXIMUM TIME INTERVAL ERROR TEST SIGNAL GENERATING APPARATUS NOT AFFECTED BY LOW-PASS MEASURING FILTER

CROSS-REFERENCE TO RELATED APPLICATIONS

This application is based upon and claims the benefit of priority from the prior Japanese Patent Application No. 2002-303552, filed Oct. 17, 2002, the entire contents of which are incorporated herein by reference.

BACKGROUND OF THE INVENTION

1. Field of the Invention

The present invention relates to an MTIE test signal generating apparatus for generating a phase modulation signal necessary for obtaining a desired wander in maximum time interval error (MTIE) characteristic and more particularly to an MTIE test signal generating apparatus which adopts technology for prohibiting generation of a measurement error due to the influence of a high-cut filter for extracting a wander in an MTIE measuring apparatus.

2. Description of the Related Art

Upon testing the characteristics of a synchronous digital hierarchy (SDH) communication system on changes in phase, a test signal specified by an evaluation amount called maximum time interval error (MTIE) is necessary.

The MTIE indicates the maximum value of differences between the maximum value and minimum value of time error with respect to a reference phase of a transmission clock signal in some observation period $\tau$. If it is assumed that a time error of a transmission clock signal with respect to the reference phase is $x(t)$ and a sampling series obtained by sampling this $x(t)$ in a predetermined cycle $\tau o$ is $x(i\tau o)$, this is defined according to a following equation.

$$MTIE(\tau)=MTIE(n\tau o)=\max\{\max'\ [\ x(i\tau o)]-\min'[x(i\tau o)]\ (n=1, 2, 3, \ldots, N-1),$$

where a symbol max indicates a maximum value in a range of $1 \leq k \leq N-n$, a symbol max' indicates a maximum value in a range of $k \leq i \leq k+n$ and a symbol min' indicates a minimum value in a range of $k \leq i \leq k+n$.

Figure 6:
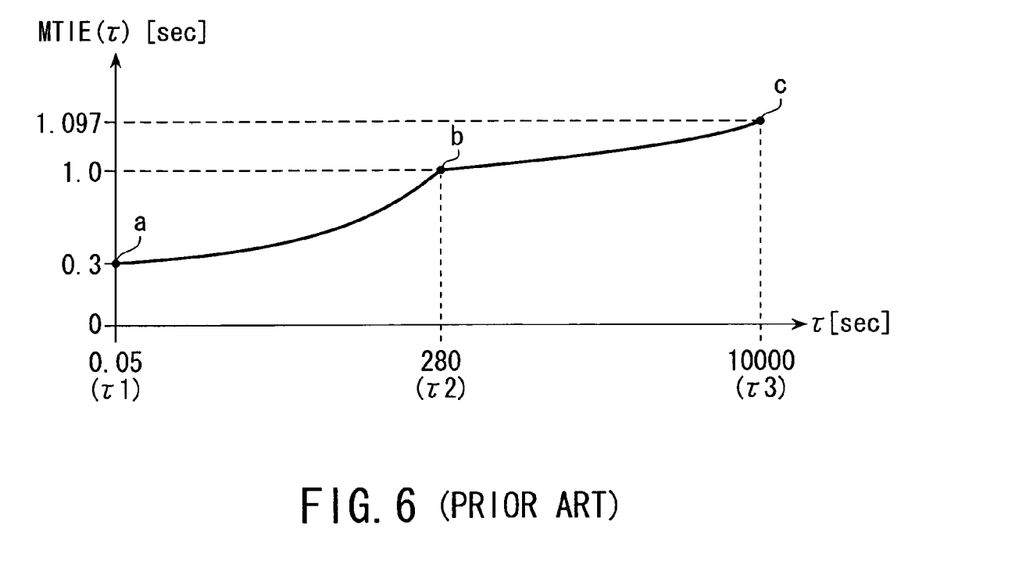
FIG. 6 is a diagram showing an example of MTIE characteristic specified conventionally.

For such a defined MTIE, ITU Table 10/G. 812 includes a specification about the MTIE characteristic as a standard for use in the MTIE tolerance test for a communication system in which as shown in FIG. 6, the values of the MTIE ($\tau$) at specific plural observation times $\tau 1=0.05$ sec, $\tau 2=280$ sec, $\tau 3=10000$ sec are 0.3 $\mu$sec, 1.0 $\mu$sec and 1.097 $\mu$sec, respectively.

That is, when an MTIE tolerance test on communication system is carried out, it is necessary to use a clock or data signal modulated in phase under a characteristic shown in FIG. 6.

Because the characteristic shown in FIG. 6 expresses graduations based on the logarithm of the observation time axis (abscissa) and MTIE axis (ordinate), an interval between specific points a and b and an interval between specific points b and c are changed in the form of a curved line.

Figure 7:
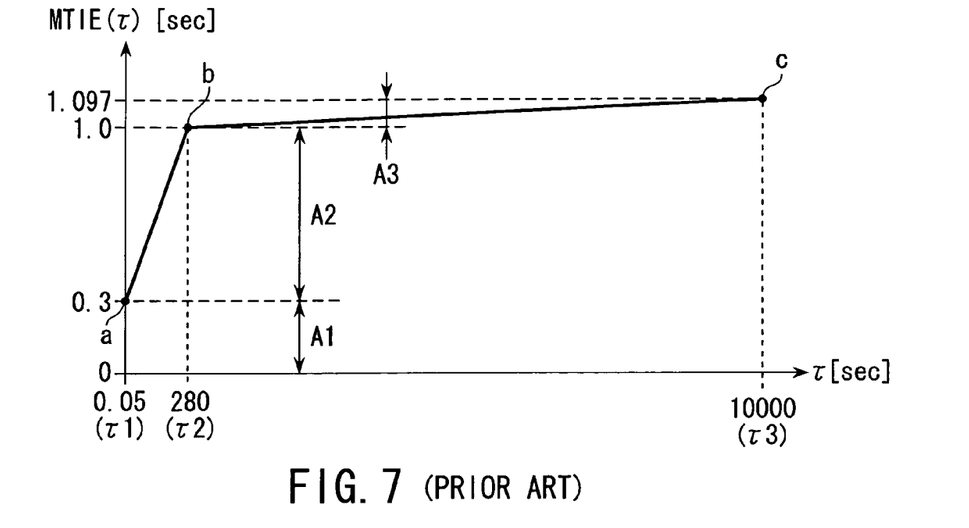
FIG. 7 is a diagram which expresses the MTIE characteristic of FIG. 6 in linear scale.

FIG. 7 indicates a case where the observation time axis (abscissa) and MTIE axis in FIG. 6 are converted into linear graduations and intervals between a, b, and c are changed linearly in the form of a broken line.

This relationship is expressed by following linear expressions.

$$MTIE(\tau)=0.3+0.0025\tau(0.05<\tau\leq280)$$

$$MTIE(\tau)=0.997+0.00001\tau(280<\tau)$$

A phase modulation signal necessary for supplying a signal with a change in phase of the MTIE characteristic which increases monotonously in the form of a broken line can be generated by synthesizing plural signals having a predetermined amplitude (voltage) and cycle.

That is, in order to supply with a change in phase of 0.3 $\mu$sec in an observation period of $\tau 1=0.05$ sec like specific points a in FIGS. 6, 7, a first signal S1 whose amplitude (voltage) is changed monotonously by only A1 is necessary so that a change in phase of 0.3 $\mu$sec is provided while 0.05 sec elapses since the start of observation.

Further, in order to supply with a change in phase of 1.0 $\mu$sec in an observation period of 280 sec like a specific point b, a second signal S2 whose amplitude (voltage) is changed monotonously is necessary so that a change in phase of 1.0 $\mu$sec can be provided while 280 sec elapses since the start of observation.

In this case, because there is already a change in phase of 0.3 $\mu$sec by the first signal S1, actually, the second signal S2 only should be a signal whose amplitude (voltage) is changed monotonously by only A2 so that a change in phase of 0.7 (=1.0−0.3) $\mu$sec can be provided while 280 sec elapse since 0.5 sec can be provided after the start of observation.

Likewise, in order to provide a change in phase of 1.097 $\mu$sec in the observation period of 10000 sec like a specific point c, a third signal S3 whose amplitude (voltage) is changed monotonously is necessary so that the change in phase of 1.097 $\mu$sec is provided while 10000 sec elapse since the start of observation.

In this case, because the change in phase of 1.0 (=0.3+0.7) $\mu$sec is already provided by the first signal S1 and the second signal S2, actually, the third signal S3 only should be a signal whose amplitude (voltage) is changed monotonously by only A3 so that a change in phase of 0.097 (=1.097−1.0) $\mu$sec can be provided while 10000 sec elapse 280 sec after the start of observation.

To generate the above-described signal having a change in phase of the MTIE characteristic, a clock signal from the reference clock generator described later is modulated in phase with the phase modulation signal S obtained by synthesizing the first signal S1, the second signal S2 and the third signal S3 by summing.

Here, the first signal S1 is a signal whose amplitude (voltage) is changed monotonously by only A1 in an interval of 0.05 sec while this amplitude (voltage) is changed repeatedly in a maximum observation period of 10000 sec.

Further, the second signal S2 is a signal whose amplitude (voltage) is changed monotonously by only A2 in an interval of 280 sec while this amplitude (voltage) is changed repeatedly in a maximum observation period of 10000 sec.

The third signal S3 is a signal whose amplitude (voltage) is changed monotonously by only A3 in an interval of 10000 sec.

Figure 8:
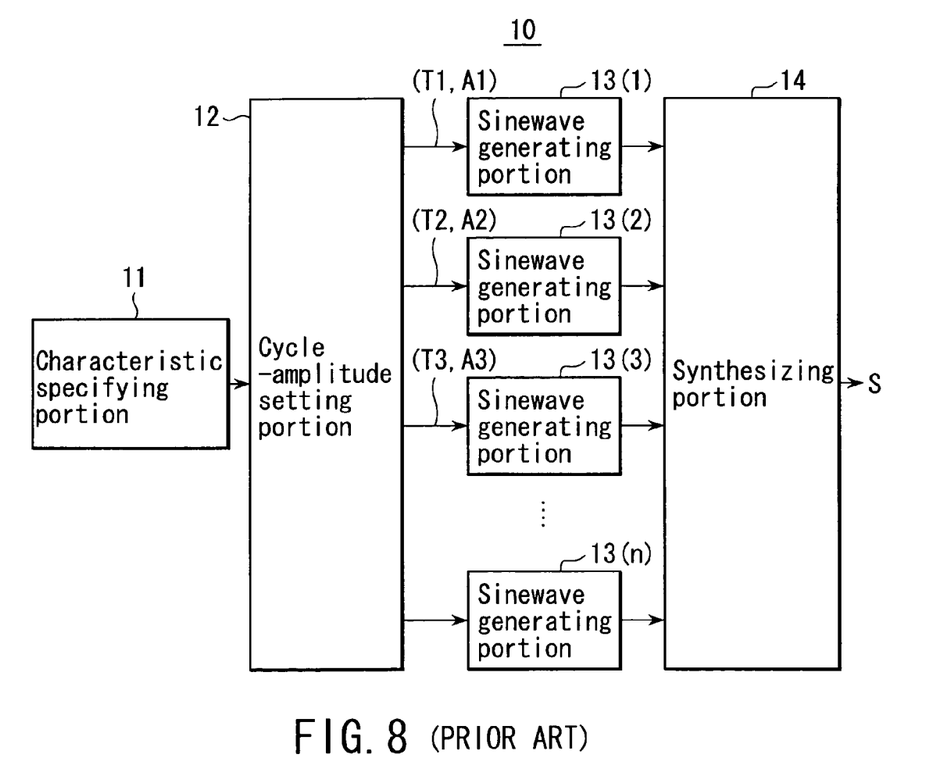
FIG. 8 is a block diagram showing an example of the structure of the conventional MTIE test signal generating apparatus.

FIG. 8 shows a block structure of a conventional MTIE test signal generating apparatus for generating the phase modulation signal S which provides the change in phase of a predetermined MTIE characteristic based on a principle described above.

This MTIE test signal generating apparatus 10 comprises a characteristic specifying portion 11, a cycle-amplitude setting portion 12, plural sine wave generating portions 13(1), 13(2), ... 13(n) and a synthesizing portion 14.

The characteristic specifying portion 11 specifies a desired MTIE characteristic and user inputs data of each specific point of the MTIE characteristic by means of an operation portion or the like (not shown) or selects and specifies one MTIE characteristic of plural MTIE characteristics based on specific point data stored in a memory in advance.

The cycle-amplitude setting portion 12 determines cycles T1, T2, . . . Tk and amplitudes A1, A2, . . . Ak of k signals S1, S2, . . . Sk necessary for generating the phase modulation signal S, based on data on the specific points of the MTIE characteristic specified by the characteristic specifying portion 11, according to the same procedure as described with reference to FIGS. 6, 7 and sets those in correspondence to plural (k) sine wave generating portions 13(1), 13(2), . . . 13(k).

Although the amplitudes A1, A2, . . . Ak will be explained by assuming a positive or negative voltage between sine wave peaks, instead it is permissible to employ a voltage from a zero point to a positive or negative peak.

For example, if the aforementioned MTIE regular characteristic is specified by the characteristic specifying portion 11, the cycle-amplitude setting portion 12 sets cycle T1=0.10 (=τ1×2) and amplitude A1=α·0.3 (α is a coefficient which relates a voltage to the phase of a clock modulated in phase) in the sine wave generating portion 13(1).

The cycle-amplitude setting portion 12 sets cycle T2=560 (=τ2×2) and amplitude A2=α·0.7 in the sine wave generating portion 12(2).

The cycle-amplitude setting portion 12 sets cycle T3=20000 (=τ3×2) and amplitude A3=α·0.097 in the sine wave generating portion 13(3).

The plural sine wave generating portions 13(1), 13(2), . . . 13(n) are so constructed that each thereof outputs a sine wave signal having a cycle and amplitude set by the cycle-amplitude setting portion 12.

Here, it is assumed that the cycles T1, T2, T3 and amplitudes A1, A2, A3 are set by the aforementioned cycle-amplitude setting portion 12.

Figure 9A:
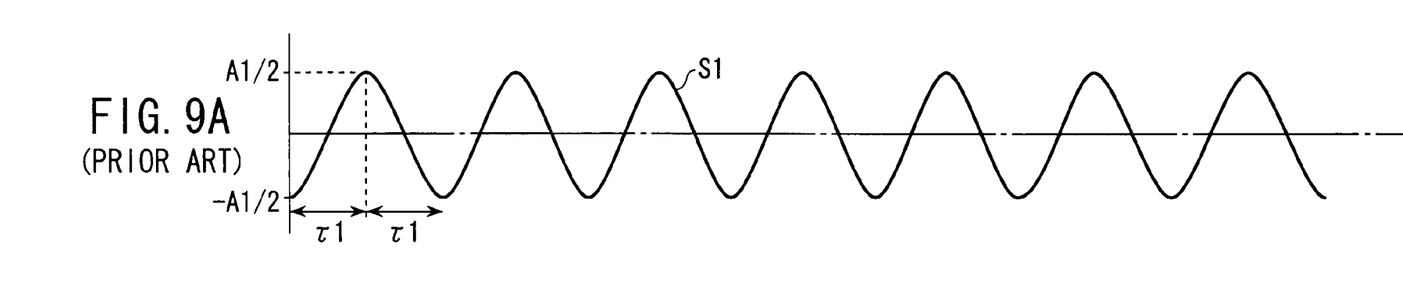
FIGS. 9A, 9B and 9C are signal waveform diagrams for explaining the operation of the conventional MTIE test signal generating apparatus.

First, as shown in FIG. 9A, a first signal S1 of sine wave having a cycle T1 and an amplitude A1 is output from the sine wave generating portion 13(1).

Figure 9B:
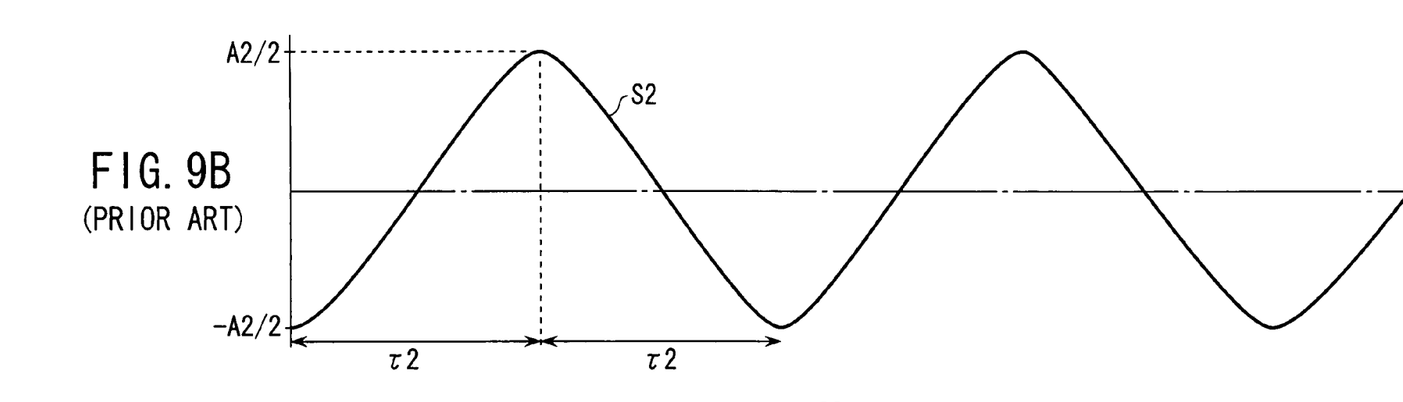

As shown in FIG. 9B, a second signal S2 of sine wave having a cycle T2 and an amplitude A2 is output from the sine wave generating portion 13(2).

Figure 9C:
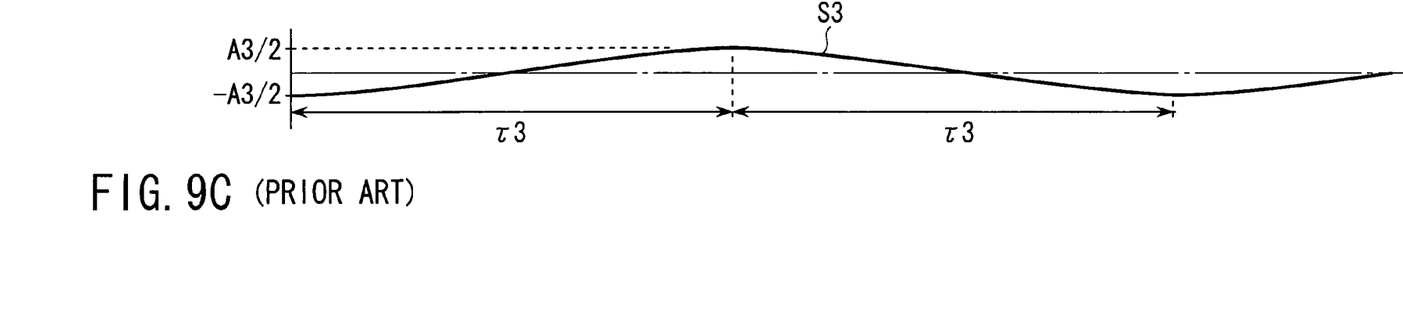

As shown in FIG. 9C, a third signal S3 of sine wave having a cycle T3 and an amplitude A3 is output from the sine wave generating portion 13(3).

The synthesizing portion 14 outputs a signal obtained by synthesizing respective signals S1, S2, . . . Sk output from the sine wave generating portions 13(1), 13(2), . . . 13(k) by summing as the phase modulation signal S which provides a change in phase of the specified MTIE characteristic.

Figure 10:
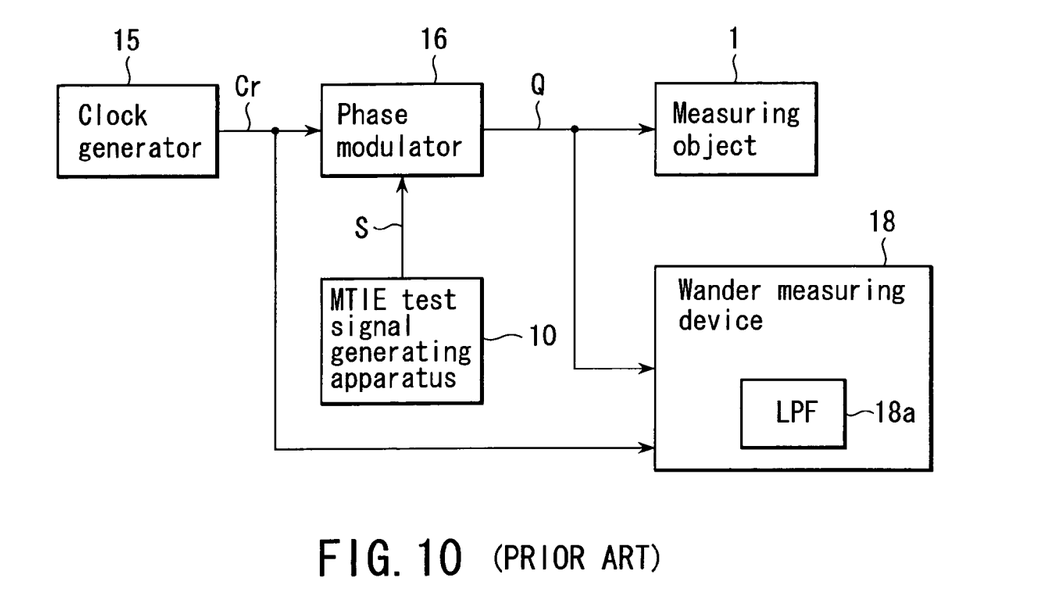
FIG. 10 is a block diagram showing the structure of the conventional MTIE tolerance measuring system.

FIG. 10 shows a structure example of the MTIE tolerance measuring system for measuring an MTIE tolerance using an MTIE test signal generating apparatus 10 having the structure shown in FIG. 8.

In this MTIE tolerance measuring system, a clock signal Cr whose phase is stabilized by a predetermined frequency output from the clock generator 15 and the phase modulation signal S output from the MTIE test signal generating apparatus 10 are input to the phase modulator 16.

The phase modulator 16 outputs a signal obtained by modulating the clock signal Cr in terms of phase with the phase modulation signal S to a measuring object 1 as a test signal Q.

In the meantime, a data signal generated synchronously with the phase-modulated clock signal may be utilized.

The measuring object 1 receives the test signal Q and executes synchronous processing, error detection processing and the like internally.

At that time, if the measuring object 1 can follow changes in phase of the test signal Q, its synchronism is established and because a probability that an error is detected is very low, it is evaluated that the measuring object 1 has an excellent MTIE tolerance.

On the other hand, if the measuring object 1 cannot follow changes in the phase of the test signal Q, synchronism is not established so that signal operation becomes unstable and detected errors increase. Consequently, it is evaluated that the measuring object 1 has an inferior MTIE tolerance.

In this MTIE tolerance measuring system, a wander measuring device 18 having a following structure is used as an MTIE measuring unit which acts as a monitor for recognizing calibration of the test signal Q and whether or not its test signal Q is input to the measuring object 1 properly.

This wander measuring device 18 detects a phase change component of the test signal Q with the phase of the clock signal Cr output from the clock generator 15 being as a reference phase.

Next, the wander measuring device 18 extracts components below 10 Hz from the detected phase change component with a low-pass measuring filter (hereinafter referred to as LPF) 18a as a wander component.

The wander measuring device 18 carries out operation processing with respect to the extracted wander component based on the definition of the aforementioned MTIE so as to detect the MTIE characteristic of the test signal Q.

However, if the MTIE characteristic of the test signal Q is monitored with the wander measuring device 18 in the above-described MTIE tolerance measuring system, an undesired phenomenon that the MTIE characteristic of the test signal Q does not coincide with the MTIE characteristic detected by the wander measuring device 18 occurs.

This phenomenon is generated by the influence of the LPF 18a for extracting a wander provided at an input portion of the wander measuring device 18.

This results from that it is specified that the LPF 18a used in the wander measuring device 18 has a predetermined high-cut characteristic according to ITU-TO. 172, 10.2.2 of the ITU standard.

Figure 11:
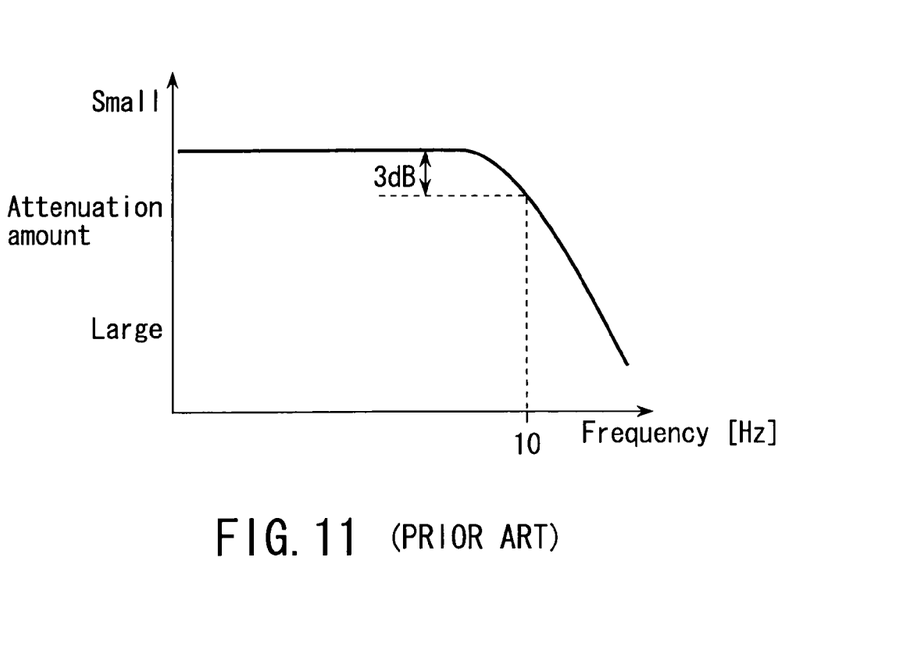
FIG. 11 is a diagram showing the characteristic of a low pass measuring filter (LPF) for extracting a wander specified conventionally.

That is, according to the predetermined high-cut characteristic, it has been specified that this LPF 18a has an attenuation of −3 dB at 10 Hz±10% as shown in FIG. 11 and should have a high-cut characteristic (time constant) which attenuates higher frequency components relatively steeply.

Thus, of the three signals S1, S2, S3 corresponding to the specific points a, b, c in the above-described regular MTIE characteristic, the component of the first signal S1 having the highest frequency of 10 Hz receives an attenuation by this LPF 18a.

Although the above-described case is that the respective signals S1, S2, S3 have sine wave waveform, if a waveform other than the sine wave in which monotonous increase and monotonous decrease are repeated is utilized, high-frequency components higher than 10 Hz are attenuated by the LPF 18a even if the frequency of the basic wave component of that signal is not greater than 10 Hz, a peak value of a signal passing the LPF 18a does not reach a peak value of its original signal.

As a result, it comes that the MTIE characteristic detected by the wander measuring device 18 is largely different from the MTIE characteristic of the test signal Q, so that the reliability of the entire MTIE tolerance measuring system is reduced remarkably.

BRIEF SUMMARY OF THE INVENTION

The object of the present invention is to solve the above-described conventional problems and then provide an MTIE test signal generating apparatus capable of detecting an MTIE characteristic by means of an MTIE measuring unit including a wander measuring device by adopting technology for prohibiting occurrence of a measuring error due to an influence of a high-cut filter for extracting a wander in the MTIE measuring unit.

In order to achieve the above object, according to a first aspect of the invention, there is provided a Maximum Time Interval Error (MTIE) test signal generating apparatus in which a signal obtained by modulating a clock signal from a reference clock generator in terms of phase by means of a predetermined MTIE test signal is input to a maximum time interval error (MTIE) measuring unit including a low-pass measuring filter having a predetermined high-cut characteristic at an input portion thereof so as to generate the predetermined MTIE test signal which enables measurement of a predetermined MTIE characteristic based on the signal, comprising:

a cycle-amplitude setting portion which sets a cycle corresponding to an observation time of each of desired plural specific points for a predetermined MTIE characteristic of plural MTIE characteristics and an amplitude corresponding to a difference in the MTIE value between adjacent specific points of the desired plural specific points;

plural signal generating portions which generate plural signals each having a cycle corresponding to an observation time of each of the desired plural specific points and an amplitude corresponding to a difference in MTIE value between adjacent specific points of the desired plural specific points, the cycle and amplitude being set by the cycle-amplitude setting portion and having repetitive waveforms in which after the signal amplitude increases from its lower limit value to its upper limit value during each observation time, it decreases from the upper limit value to the lower limit value and then outputting to each of the desired plural specific points;

a holding time setting portion which sets a holding time for holding the upper limit value and the lower limit value of the repetitive waveform of the signal over the predetermined time so that at least a signal cycle having the shortest cycle of the plural signals generated by the plural signal generating portions is longer than a predetermined time corresponding to the predetermined high-cut characteristic of the low-pass measuring filter in the MTIE measuring unit; and a synthesizing portion which synthesizes the plural signals output from the plural signal generating portions by summing and outputting as the predetermined MTIE test signal.

In order to achieve the above object, according to a second aspect of the invention, there is provided the MTIE test signal generating apparatus according to the first aspect, further comprising a characteristic specifying portion which specifies the predetermined MTIE characteristic of the plural MTIE characteristics to the cycle-amplitude setting portion.

In order to achieve the above object, according to a third aspect of the invention, there is provided the MTIE test signal generating apparatus according to the first aspect, wherein the holding time setting portion sets the repetitive waveform of a signal at least having the shortest cycle in the plural signal generating portions to such a waveform in which after the signal amplitude increases monotonously from its lower limit value to its upper limit value, the upper limit value is maintained over a predetermined time and then after the signal amplitude decreases from the upper limit value to the lower limit value during the observation time after the holding time elapses, the lower limit value is maintained over the predetermined time.

In order to achieve the above object, according to a fourth aspect of the invention, there is provided the MTIE test signal generating apparatus according to the first aspect, wherein the holding time setting portion is provided as a fixed holding time setting portion which sets the holding time to a fixed value over the predetermined time in a signal generating portion for generating a signal having at least the shortest cycle of the plural signal generating portions.

In order to achieve the above object, according to a fifth aspect of the invention, there is provided the MTIE test signal generating apparatus according to the first aspect, wherein the holding time setting portion has a function for setting the holding time in a signal generating portion having at least the shortest cycle of the plural signal generating portions to any value over the predetermined time.

In order to achieve the above object, according to a sixth aspect of the invention, there is provided the MTIE test signal generating apparatus according to the first aspect, wherein the holding time setting portion has a function for setting the holding time in a signal generating portion for generating a signal having at least the shortest cycle of the plural signal generating portions corresponding to a cycle set by the cycle-amplitude setting portion.

In order to achieve the above object, according to a seventh aspect of the invention, there is provided the MTIE test signal generating apparatus according to the first aspect, further comprising a high-cut frequency setting portion which, if a high-cut frequency for specifying the predetermined high-cut characteristic of the low-pass measuring filter in the MTIE measuring unit is changed, sets a high-cut frequency corresponding to the changed high-cut frequency wherein the holding time setting portion sets the holding time corresponding to a high-cut frequency set by the high-cut frequency setting portion in a signal generating portion for generating at least the shortest cycle of the plural signal generating portions.

In order to achieve the above object, according to an eighth aspect of the invention, there is provided the MTIE test signal generating apparatus according to the first aspect, wherein the plural signal generating portions generate plural signals having substantially sine wave like trapezoidal waveform or substantially linear trapezoidal repetitive waveforms.

In order to achieve the above object, according to a ninth aspect of the invention, there is provided the MTIE test signal generating apparatus according to the first aspect, wherein the cycle-amplitude setting portion, the plural signal generating portions, the holding time setting portion and the synthesizing portion are constituted of a digital signal processor and the predetermined MTIE test signal is created and output by the digital signal processor.

In order to achieve the above object, according to a tenth aspect of the invention, there is provided the MTIE test signal generating apparatus according to the ninth aspect, wherein as a phase modulator for modulating the clock signal from the reference clock generator in terms of phase with the predetermined MTIE test signal created and output by the digital signal processor, a direct digital synthesizer is employed.

In order to achieve the above object, according to an eleventh aspect of the invention, there is provided a Maximum Time Interval Error (MTIE) test signal generating apparatus in which a signal obtained by modulating a clock signal from a reference clock generator in terms of phase by means of a predetermined MTIE test signal is input to a maximum time interval error (MTIE) measuring unit including a low-pass filter having a predetermined high-cut characteristic at an input portion thereof so as to generate the predetermined MTIE test signal which enables measurement of a predetermined MTIE characteristic based on the signal, comprising:

a cycle-amplitude information setting portion which sets cycle information corresponding to an observation time of each of desired plural specific points about a desired MTIE characteristic of plural MTIE characteristics and amplitude information corresponding to a difference in MTIE value between adjacent specific points of the desired plural specific points;

plural signal waveform information generating portions which generates waveform information about plural signals having such a repetitive waveform in which after a signal amplitude increases form its lower limit value to its upper limit value during the each observation time, the signal amplitude decreases from the upper limit value to the lower limit value, based on cycle information corresponding to an observation time of each of the desired plural specific points set by the cycle-amplitude information setting portion and amplitude information corresponding to a difference in MTIE value between adjacent specific points of the desired plural specific points and outputs to each of the desired plural specific points;

a holding time information setting portion which sets holding time information for holding the upper limit value and the lower limit value of the signal repetitive waveform for over the predetermined time so that the cycle of a signal having at least the shortest cycle in waveform information of the plural signals generated from the plural signal waveform information generating portions is longer than a predetermined time corresponding to the predetermined high-cut characteristic of the low-pass measuring filter in the MTIE measuring unit; and a waveform information synthesizing portion which synthesizes the plural signal waveform information output from the plural signal waveform generating portions by summing so as to create and output the predetermined MTIE test signal.

In order to achieve the above object, according to a twelfth aspect of the invention, there is provided the MTIE test signal generating apparatus according to the eleventh aspect, wherein the cycle-amplitude setting portion, the plural signal generating portions, the holding time setting portion and the synthesizing portion are constituted of a digital signal processor and the predetermined MTIE test signal is created and output by the digital signal processor.

In order to achieve the above object, according to a thirteenth aspect of the invention, there is provided the MTIE test signal generating apparatus according to the twelfth aspect, wherein as a phase modulator for modulating the clock signal from the reference clock generator in terms of phase with the predetermined MTIE test signal created and output by the digital signal processor, a direct digital synthesizer is employed.

In order to achieve the above object, according to a fourteenth aspect of the invention, there is provided a Maximum Time Interval Error (MTIE) test signal generating method in which a signal obtained by modulating a clock signal from a reference clock generator in terms of phase by means of a predetermined MTIE test signal is input to a maximum time interval error (MTIE) measuring unit including a low-pass filter having a predetermined high-cut characteristic at an input portion thereof so as to generate the predetermined MTIE test signal which enables measurement of a predetermined MTIE characteristic based on the signal, comprising:

setting a cycle corresponding to an observation time of each of desired plural specific points for a predetermined MTIE characteristic of plural MTIE characteristics and an amplitude corresponding to a difference in the MTIE value between adjacent specific points of the desired plural specific points;

generating plural signals each having a cycle corresponding to an observation time of each of the desired plural specific points and an amplitude corresponding to a difference in MTIE value between adjacent specific points of the desired plural specific points and having repetitive waveforms in which after the signal amplitude increases from its lower limit value to its upper limit value during the each observation time, it decreases from the upper limit value to the lower limit value and then outputting to each of the desired plural specific points;

setting a holding time for holding the upper limit value and the lower limit value of the repetitive waveform of the signal over the predetermined time so that a signal cycle having at least the shortest cycle when the plural signals are generated is longer than a predetermined time corresponding to the predetermined high-cut characteristic of the low-pass measuring filter in the MTIE measuring unit; and synthesizing the plural signals by summing and outputting as the predetermined MTIE test signal.

In order to achieve the above object, according to a fifteenth aspect of the invention, there is provided the MTIE test signal generating method according to the fourteenth aspect, further comprising specifying the desired MTIE characteristic from the plural MTIE characteristics.

In order to achieve the above object, according to a sixteenth aspect of the invention, there is provided the MTIE test signal generating method according to the fifteenth aspect, wherein setting of the holding time is executed by setting the holding time to a fixed value over the predetermined time when a signal having at least the shortest cycle is generated.

In order to achieve the above object, according to a seventeenth aspect of the invention, there is provided the MTIE test signal generating method according to the fourteenth aspect, wherein setting of the holding time is executed by setting the holding time to any value over the predetermined time when a signal having at least the shortest cycle is generated.

In order to achieve the above object, according to an eighteenth aspect of the invention, there is provided the MTIE test signal generating method according to the fourteenth aspect, wherein setting of the holding time is executed by setting the holding time corresponding to a cycle set at the time of setting the cycle when a signal having at least the shortest cycle is generated.

In order to achieve the above object, according to a nineteenth aspect of the invention, there is provided the MTIE test signal generating method according to the fourteenth aspect, further comprising when a high-cut frequency for specifying the predetermined high-cut characteristic of the low-pass measuring filter of the MTIE measuring unit is changed, setting a high-cut frequency corresponding to the changed high-cut frequency, wherein setting of the holding time is executed by setting the holding time corresponding to a high-cut frequency set by the high-cut frequency when a signal having at least the shortest cycle is generated.

In order to achieve the above object, according to a twentieth aspect of the invention, there is provided the MTIE test signal generating method according to the fourteenth aspect, wherein generation of the plural signals is to generate plural signals having substantially sine wave like trapezoidal waveform or substantially linear trapezoidal repetitive waveforms.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference numerals designate like or corresponding parts.

Hereinafter, the embodiments of the MTIE test signal generating apparatus of the present invention will be described with reference to the accompanying drawings.

(First Embodiment)

Figure 1:
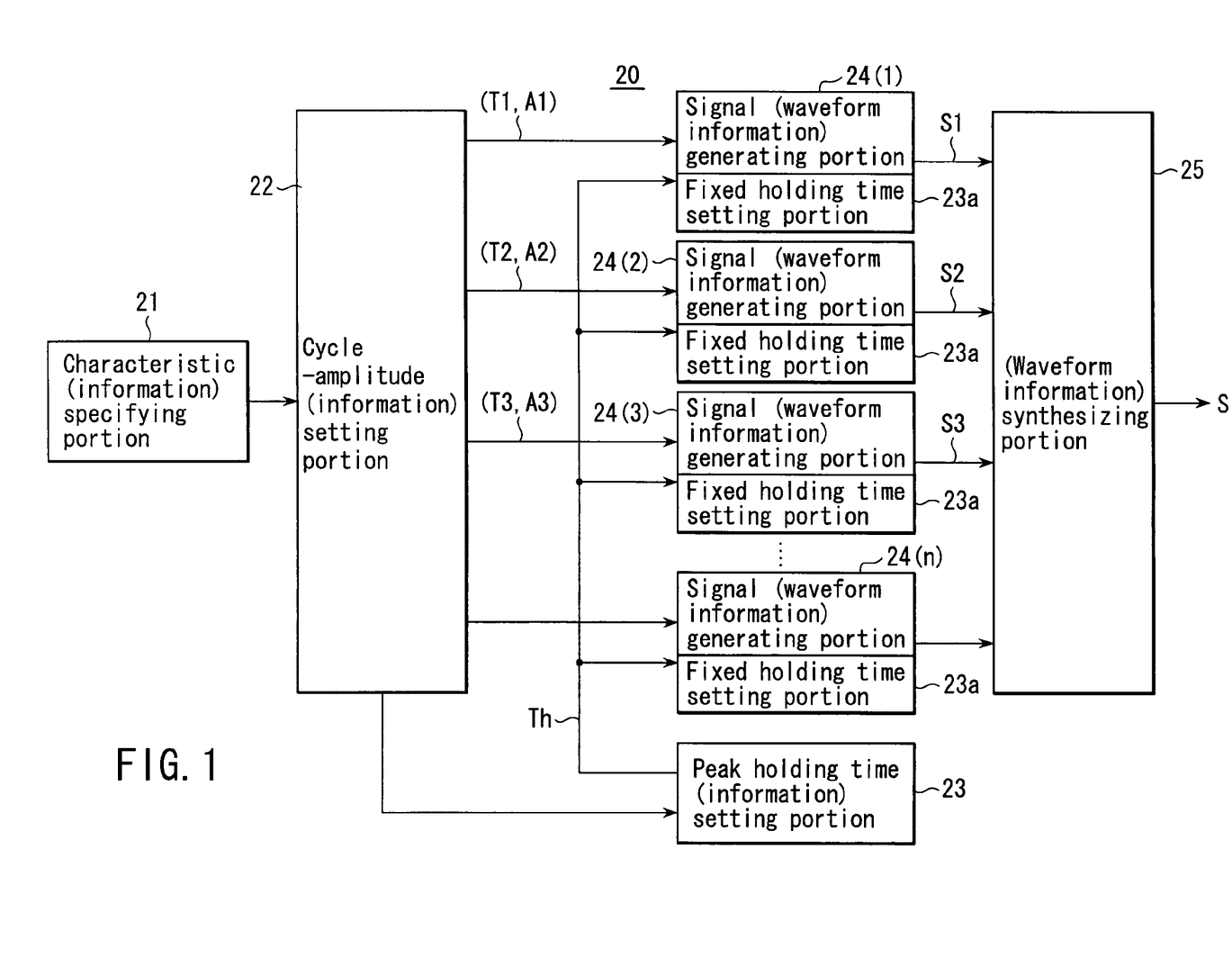
FIG. 1 is a block diagram showing the structure of the MTIE test signal generating apparatus according to a first embodiment of the present invention.

FIG. 1 shows a block structure of an MTIE test signal generating apparatus 20 according to the first embodiment of the present invention.

This MTIE test signal generating apparatus 20 comprises a characteristic specifying portion 21, a cycle-amplitude setting portion 22, a holding time setting portion (peak holding time setting portion) 23, plural signal generating portions 24(1), 24(2), . . . 24(n) and a synthesizing portion 25.

The characteristic specifying portion 21 specifies a desired MTIE characteristic from plural MTIE characteristics including plural specific points. User inputs data about observation time and MTIE value of each specific point of the desired MTIE characteristic through an operating portion or the like (not shown) of the characteristic specifying portion 21 or selects and specifies one of the plural MTIE characteristics based on data about the specific points stored in a memory in advance.

The cycle-amplitude setting portion 22 acquires an observation time of each specific point of the MTIE characteristic specified by the characteristic specifying portion 21 and an amplitude corresponding to a difference in MTIE value between adjacent specific points of the plural specific points based on the same procedure as described with FIGS. 6, 7 so as to determine cycles T1, T2, . . . Tk and amplitudes (voltage between upper limit value and lower limit value (peak)) A1, A2, . . . Ak and then, sets those cycles in k signal generating portions 24(1), 24(2), . . . 24(k) of the plural signal generating portions 24(1), 24(2), 24(n).

The peak holding time setting portion 23 receives data about cycles T1, T2, . . . Tk determined by the cycle-amplitude setting portion 22 and if any one of the frequencies f1, f2, . . . fk corresponding to the cycle falls under an attenuation band (band in which an attenuation amount increases as the frequency increases) of the LPF 18a for extracting a wander, predetermined upper limit value and lower limit value (peak) holding time Th is set in k signal generating portions 24(1), 24(2), . . . 24(k).

Here, the peak holding time Th which is set by the peak holding time setting portion 23 may be a fixed value or a variable value and if it is a fixed value, for example, a value corresponding to the high-cut frequency of the LPF 18a, which will be described later, is adopted.

If the high-cut frequency of the LPF 18a for extracting a wander is fc (=10 Hz), its time constant Tc is ½ πfc. If the k signal generating portions 24(1), 24(2), . . . 24(k) generate a signal which holds the peak value in a time interval four times to five times longer and a test signal including those components is input to the LPF 18a, the peak value of a signal passing the LPF 18a can be made approximately equal to a peak value of an input signal.

Thus, the peak holding time Th should be for example, ½ πfc or more or ⅝ πfc or more.

Here, the lower limit value of the peak holding time Th depends on a waveform within an observation time and if changes in the waveform are slow, that peak holding time may be short. If changes in the waveform are quick, it needs to be prolonged.

If the peak holding time Th is set to any variable value, user acquires any peak holding time corresponding to a cycle set by the cycle-amplitude setting portion 22 and sets this value manually.

User may obtain the peak value holding time Th corresponding to a ratio or a difference between a maximum frequency fx which falls under the attenuation band and a lower limit frequency fr of the attenuation band of the LPF 18a of the frequencies f1, f2, . . . fk corresponding to the respective cycles T1, T2, . . . Tk and then, set this value in the signal generating portions 24(1), 24(2), . . . 24(k).

In this case, the peak holding time setting portion 23 may automatically execute the operation processing and set a computed peak holding time Th in the signal generating portions 24(1), 24(2), . . . 24(k).

In this case, the peak value holding time Th is set to be of a time more than a minimum necessary time in order to make the peak value of a signal which passes the LPF 18a approximately equal to the peak value of the input signal.

Unless the peak holding time Th is set by the peak holding time setting portion 23, the signal generating portions 24(1), 24(2), . . . 24(k) outputs a sine wave signal having a cycle and amplitude set by the cycle-amplitude setting portion 22.

Further, if the peak holding time Th is set by the peak holding time setting portion 23, by holding both peak values of the sine wave having the cycle and amplitude set by the cycle-amplitude setting portion 22 extendedly in a time interval of Th, the signal generating portions 24(1), 24(2), . . . 24(k) outputs a substantially a trapezoidal-wave signal in which a portion of the both peaks of the sine wave is in a horizontal condition.

The synthesizing portion 25 outputs a signal obtained by synthesizing respective signals S1, S2, . . . Sk output from the signal generating portions 24(1), 24(2), . . . 24(k) by summing as a phase modulation signal S which provides changes in the phase of a specified MTIE characteristic.

Next, the operation of the MTIE test signal generating apparatus 20 having the above-described structure will be described.

For example, if the MTIE characteristic of FIG. 6 is specified by the characteristic specifying portion 21, the cycle-amplitude setting portion 22 sets the cycle T1=0.10 (=τ1×2) and amplitude A1=α·0.3 in the signal generating portion 24(1).

Further, the cycle-amplitude setting portion 22 sets the cycle T2=560 (=τ2×2) and amplitude A2= α·0.7 in the signal generating portion 24(2).

Further, the cycle-amplitude setting portion 22 sets the cycle T3=20000 (=τ3×2) and amplitude A3= α·0.097 in the signal generating portion 24(3).

Figure 2A:
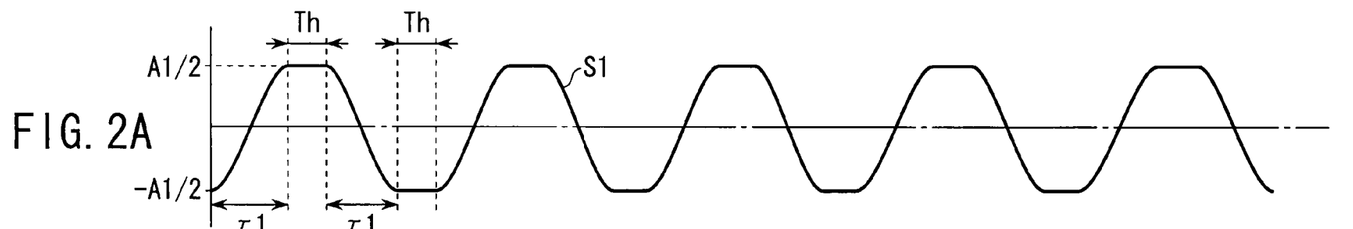
FIGS. 2A, 2B and 2C are signal waveform diagrams for explaining the operation of major components of FIG. 1.

The signal generating portion 24(1) outputs a first signal S1 and according to this first signal S1, as shown in FIG. 2A, the amplitude (voltage) increases monotonously from its lower limit value (one peak value) −A1/2 by the amount of an amplitude A1 in sine wave fashion and reaches its upper limit value (other side peak value) A1/2 in a time interval of ½ the cycle T1 (that is, observation time τ1) set by the cycle-amplitude setting portion 22 and after that, the upper limit value (other peak value) A1/2 is maintained just in the peak holding time Th. Then, the amplitude (voltage) decreases monotonously by the amount of an amplitude A1 in the sine wave fashion in the time interval of the observation time (τ1) after that holding time elapses and reaches the lower limit value (one side peak value) and after that, the peak value A1/2 is maintained just in the time interval of Th so that a substantially trapezoidal waveform is repeated.

Figure 2B:
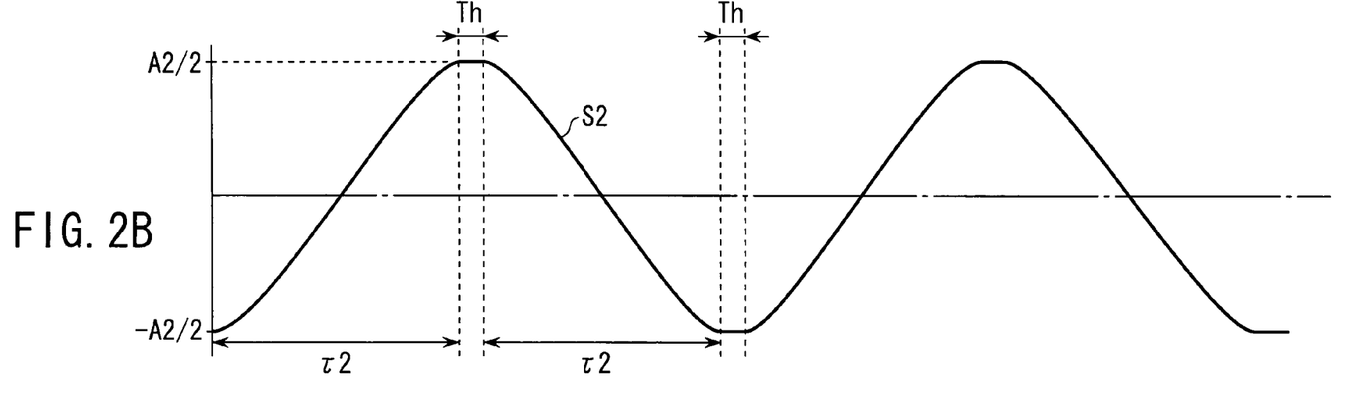

Likewise, the signal generating portion 24(2) outputs a second signal S2. According to this second signal S2, as shown in FIG. 2B, a lower limit value (one peak value) and an upper limit value (other peak value) of sine wave having the cycle T2 and amplitude A2 set by the cycle-amplitude setting portion 22 or both peak values ±A2/2 are held extendedly just in the time interval of Th so that a substantially trapezoidal waveform is repeated.

Figure 2C:
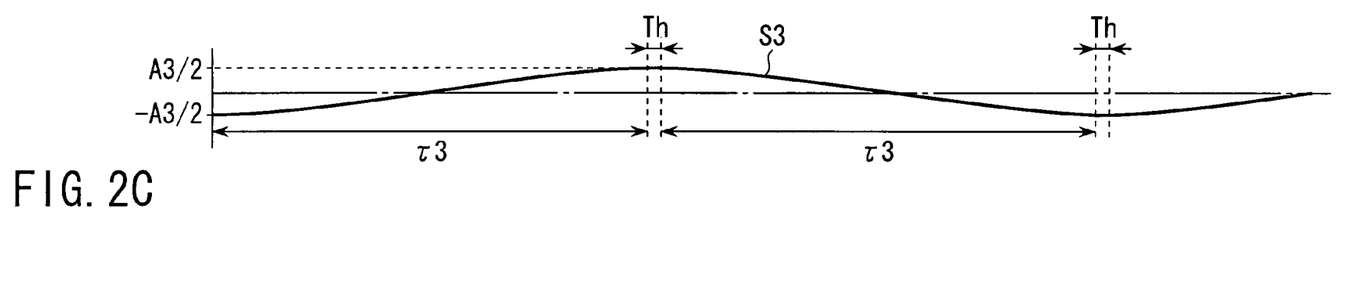

Likewise, a signal generating portion 24(3) outputs a third signal S2. According to this third signal S3, as shown in FIG. 2C, a lower limit value (one peak value) and an upper limit value (other peak value) of a sine wave having a cycle T3 and an amplitude A3 set by the cycle-amplitude setting portion 22 or the both peak values ±A3/2 are held just in the time interval of Th so that a substantially trapezoidal waveform is repeated.

The first, second and third signals S1, S2, S3 output from these signal generating portions 24(1), 24(2), 24(3) are synthesized by summing by the synthesizing portion 25. A signal S obtained by this synthesizing by summing is output from this synthesizing portion 25 as a phase modulation signal.

If the phase modulation signal S obtained in this way is utilized for the MTIE tolerance measuring system shown in FIG. 10, a test signal Q generated by modulating a clock Cr in terms of phase sent from a clock generator 15 according to the phase modulation signal S is input to a wander measuring unit 18.

However, in this case, because the test signal Q is not affected by the LPF 18a having the predetermined high-cut characteristic included in the input portion of the wander measuring portion 18, the MTIE tolerance measuring system is capable of executing a highly reliable measurement as a whole.

That is, the LPF 18a of the wander measuring unit 18 extracts respective components of the phase modulation signal S included in the test signal Q.

The first, second and third signals S1, S2, S3 included in this phase modulation signal S are substantially trapezoidal waveforms in which both peak values of the sine wave having a cycle and an amplitude set by the cycle-amplitude setting portion 22 are held extendedly just in the time interval of Th. Consequently, its cycle is longer than the original sine wave only by Th and its holding time is sufficiently longer than a time constant which stipulates the predetermined high-cut characteristic of the LPF 18a.

Figure 3A:
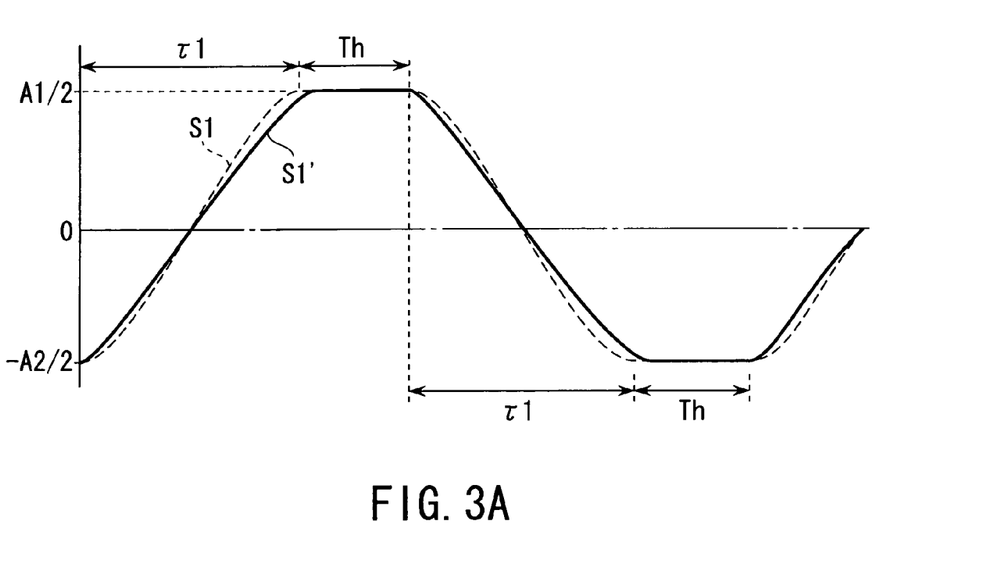
FIG. 3A is a diagram showing the output component waveform of a high-cut filter for extracting a wander when the MTIE test signal generating apparatus of FIG. 1 is used.

For that reason, of the three signals S1, S2, S3 included in the phase modulation signal S, the waveform of an output signal S1' from the LPF 18a to the first signal S1 having the highest frequency 10 Hz increases monotonously from one peak value −A/2 up to the other peak value A1/2 in a time interval slightly longer than the observation time τ1 as shown in FIG. 3A, and its peak value is maintained and then decreases monotonously from the other peak value A1/2 up to one peak value −A1/2 in a time interval slightly longer than the observation time τ1 again.

Consequently, the peak values of the signal S1' passing the LPF 18a always reach the both peak values of the waveform of the original signal S1 without being attenuated by the LPF 18a.

Because respective waveforms of the output signals from the LPF 18a to the second and third signals S2, S3 having a much longer cycle than the first signal S1 are hardly affected by the LPF 18a, it comes that they have substantially the same waveform as the original second, third signals S2, S3 shown in FIGS. 2B and 2C.

Thus, the MTIE characteristic detected by executing operation processing based on the definition of the MTIE to a wander component output from the LPF 18a almost coincides with the MTIE characteristic of the test signal Q, so that the reliability of its measuring result is high.

The MTIE test signal generating apparatus 20 of the first embodiment may be so constructed that information about the waveforms of the respective signals S1, S2, . . . Sk is output from the plural signal generating portions 24(1), 24(2), . . . 24(k) to the synthesizing portion 25 and pieces of the waveform information are synthesized by summing by the synthesizing portion 25 so as to acquire synthesized waveform information about the respective signals S1, S2, . . . Sk and then the synthesized waveform signal S is output based on this synthesized waveform information.

In this case, the cycle-amplitude setting portion 22 in FIG. 1 functions as the cycle-amplitude information setting portion 22 for setting cycle information corresponding to the observation time at each of desired plural specific points in a desired MTIE characteristic of plural MTIE characteristics and amplitude information corresponding to a difference in MTIE value between adjacent specific points of the desired plural specific points.

The plural signal generating portions 24(1), 24(2), . . . 24(n) function as the plural signal waveform information generating portions 24(1), 24(2), . . . 24(n), in which the signal amplitude increases from its lower limit value to the upper limit value, based on cycle information corresponding to an observation time at each of the desired plural specific points set by the cycle-amplitude information setting portion 22 and amplitude information corresponding to a difference in the MTIE value between adjacent specific points of the desired plural specific points and after that, decreases from that upper limit value to the lower limit value so as to generate waveform information on the plural signals having repetitive waveform and output the waveform information corresponding to each of the desired plural specific points.

The holding time setting portion 23 functions as the holding time information setting portion 23 which sets holding time information for holding the upper limit value and lower limit value in the repetitive waveform of that signal over the predetermined time interval so that the cycle of a signal having the shortest cycle in waveform information of the plural signals generated from the plural signal waveform information generating portions 24(1), 24(2), . . . 24(n) is longer than a predetermined time determined corresponding to the high-cut characteristic of the low pass measuring filter of the MTIE measuring apparatus.

The synthesizing portion 25 functions as the waveform information synthesizing portion 25 which creates and outputs the predetermined MTIE test signal by synthesizing the plural pieces of the signal waveform information output from the plural signal waveform information generating portions 24(1), 24(2), . . . 24(n) by summing.

(Practical MTIE Tolerance Measuring System)

Figure 3B:
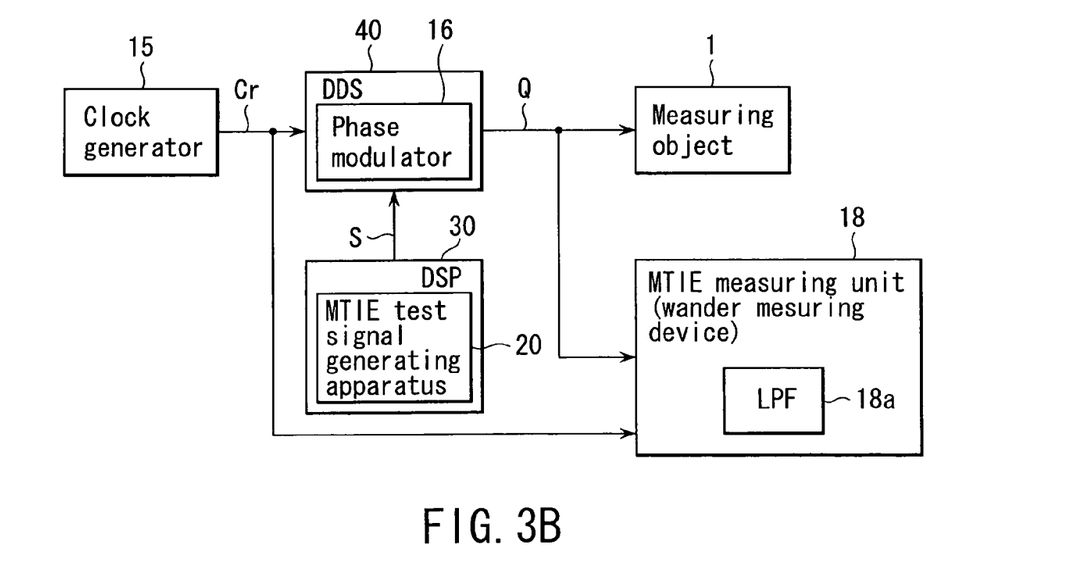
FIG. 3B is a block diagram showing an actual MTIE tolerance measuring system in which the MTIE test signal generating apparatus is constituted of a digital signal processor (DSP) while a direct digital synthesizer (DDS) is employed as a phase modulator 16 for outputting a test signal Q.

FIG. 3B is a block diagram showing a practical MTIE tolerance measuring system in which the MTIE test signal generating apparatus 20 of the present invention is constituted of a digital signal processor (DSP) and a direct digital synthesizer (DDS) is employed as the phase modulator 16 for outputting the test signal Q.

Like reference numerals are attached to the same components in FIG. 3B as those in the conventional MTIE tolerance measuring system shown in FIG. 10 and description thereof is omitted.

That is, in the MTIE tolerance measuring system shown in FIG. 3B, the MTIE test signal generating apparatus 20 including the cycle-amplitude (information) setting portion 22, the plural signal (waveform information) generating portions 24(1), 24(2), . . . 24(n), the holding time (information) setting portion 23 and the (waveform information) synthesizing portion 25 is constituted of DSP (for example, ADSP21061 made by Analog Devices Corporation) 30 and the predetermined MTIE test signal is created by the DSP 30 and output.

This DSP 30 is a processor dedicated for digital signal processing, which adopts an architecture taking high-speed operation processing performance as priority.

Thus, the DSP 30 can achieve the MTIE test signal generating apparatus including the cycle-amplitude (information) setting portion 22, the plural signal (waveform information) generating portions 24(1), 24(2), . . . 24(n), the holding time (information) setting portion 23 and (waveform information) synthesizing portion 25 of the present invention, with functional blocks including software easily.

The MTIE test signal output from the DSP 30 is used as a phase modulation signal when the clock signal from the reference clock generator 15 is modulated in terms of phase.

In this case, as the phase modulator 16 which modulates the clock signal from the reference clock generator 15 in terms of phase according to the phase modulation signal S as the MTIE test signal output from the DSP 30, the DDS (for example, AD9854 made by Analog Devices Corporation) is employed.

This DDS 40 is a circuit for creating an oscillation waveform for output by synthesizing digital data and more specifically, it reads out sine wave waveform data stored in an internal memory in advance and converts it and then outputs according to a general method.

Thus, the DDS 40 can achieve the phase modulator 16 which modulates the clock signal from the reference clock generator 15 in terms of phase with the phase modulation signal S as the MTIE test signal output from the DSP 30 with functional blocks including software easily.

Further, it can be so constructed that some function of the synthesizer 25 and the like in the DSP 30 is included in the DDS 40.

The MTIE test signal generating apparatus which is achieved with the DSP 30 and the MTIE measuring system having the phase modulator 16, which is achieved with the DDS 40 are excellent in terms of cost performance as compared with a case where those are realized by a combination of individual (discrete) circuits based on analog-like manner.

In the MTIE test signal generating apparatus 20 of the first embodiment, the plural signal generators 24(1), 24(2), . . . 24(n) output substantially trapezoidal waveform signals S1, S2, . . . Sk in which both peak values of a sine wave having a predetermined cycle and a predetermined amplitude set by the cycle-amplitude setting portion 22 are held extendedly just in an interval of a peak holding time set by the peak holding time setting portion 23 and the synthesizer 25 synthesizes these signals S1, S2, . . . Sk so as to obtain the phase modulation signal S.

For that reason, in the case of measuring a wander of the test signal Q modulated in phase by the phase modulation signal S acquired by the MTIE test signal generating apparatus 20 of the first embodiment, a measurement error due to an influence of the LPF 18a in the wander measuring unit 18 can be eliminated thereby achieving a highly reliable measurement.

Because the MTIE test signal generating apparatus 20 of the first embodiment is provided with the characteristic specifying portion 21 for specifying a desired MTIE characteristic from plural MTIE characteristics, a phase modulation signal S corresponding to an MTIE characteristic specified arbitrarily of the plural MTIE characteristics can be generated.

Because the MTIE test signal generating apparatus 20 of the first embodiment includes the peak holding time setting portion 23 for setting the peak holding time Th arbitrarily to the plural signal generating portions 24(1), 24(2), ... 24(k) as described above, an optimum peak holding time Th can be set corresponding to an observation time of each specific point for the MTIE characteristic, high-cut frequency of the LPF 18a for extracting a wander and the like.

Further, because in the MTIE test signal generating apparatus 20 of the first embodiment, as described above, the peak holding time setting portion 23 obtains a peak holding time corresponding to a cycle set by the cycle-amplitude setting portion 22 and sets that peak holding time in each of the plural signal generating portions 24(1), 24(2), ... 24(k), an optimum peak holding time can be automatically set up to the cycle set by the cycle-amplitude setting portion 22.

As for the peak holding time Th which is to be set to the plural signal generating portions 24(1), 24(1), ... 24(k) according to the first embodiment, the peak holding time Th after the simple increase in each of the signals S1, S2, ... Sk shall be the same as the peak holding time Th after the simple decrease.

However, if this peak holding time Th is longer than a time necessary for the peak value passing the aforementioned LPF 18a to be substantially equal to the peak value of its original signal, the peak holding time Th after the simple increase in each of the signals S1, S2, ... Sk and the peak holding time Th after the simple decrease do not need to be the same as each other and instead, it is permissible to set the peak holding time after the simple increase and the peak holding time after the simple decrease to different times.

Further, as for this peak holding time Th, throughout the entire cycle of each of the signals S1, S2, ... Sk, peak holding times after the simple increase or peak holding times after the simple decrease do not need to be the same as each other and instead, it is permissible to set these peak holding times so that each of them changes regularly or at random at every cycle or every plural cycles.

In the MTIE test signal generating apparatus 20 of the first embodiment, the peak holding time Th is set in the plural signal generating portions 24(1), 24(2), ... 24(k) by the peak holding time setting portion 23.

If a normally fixed peak holding time Th is set in the respective signals S1, S2, ... Sk from the plural signal generating portions 24(1), 24(2), ... 24(k), a fixed Th setting portion (23a) for setting that fixed peak holding time Th only should be provided within the plural signal generating portions 24(1), 24(2), ... 24(n).

In this case, the peak holding time setting portion 23 may be omitted.

In the MTIE test signal generating apparatus 20 of the first embodiment, all the plural signal generating portions 24(1), 24(2), ... 24(k) which output a signal for synthesis are constructed to output a waveform in which the peak value is held extendedly.

Alternatively, it is permissible to allow only a signal generating portion 24(1) which generates a signal corresponding to a specific point having the shortest observation time of the plural signal generating portions 24(1), 24(2), ... 24(k), that is, a signal having the shortest cycle or part of the other signal generating portions 24(2), ... 24(k) including that signal generating portion 24(1) to output a waveform in which the peak value is held extendedly more than a predetermined time.

(Second Embodiment)

Figure 4:
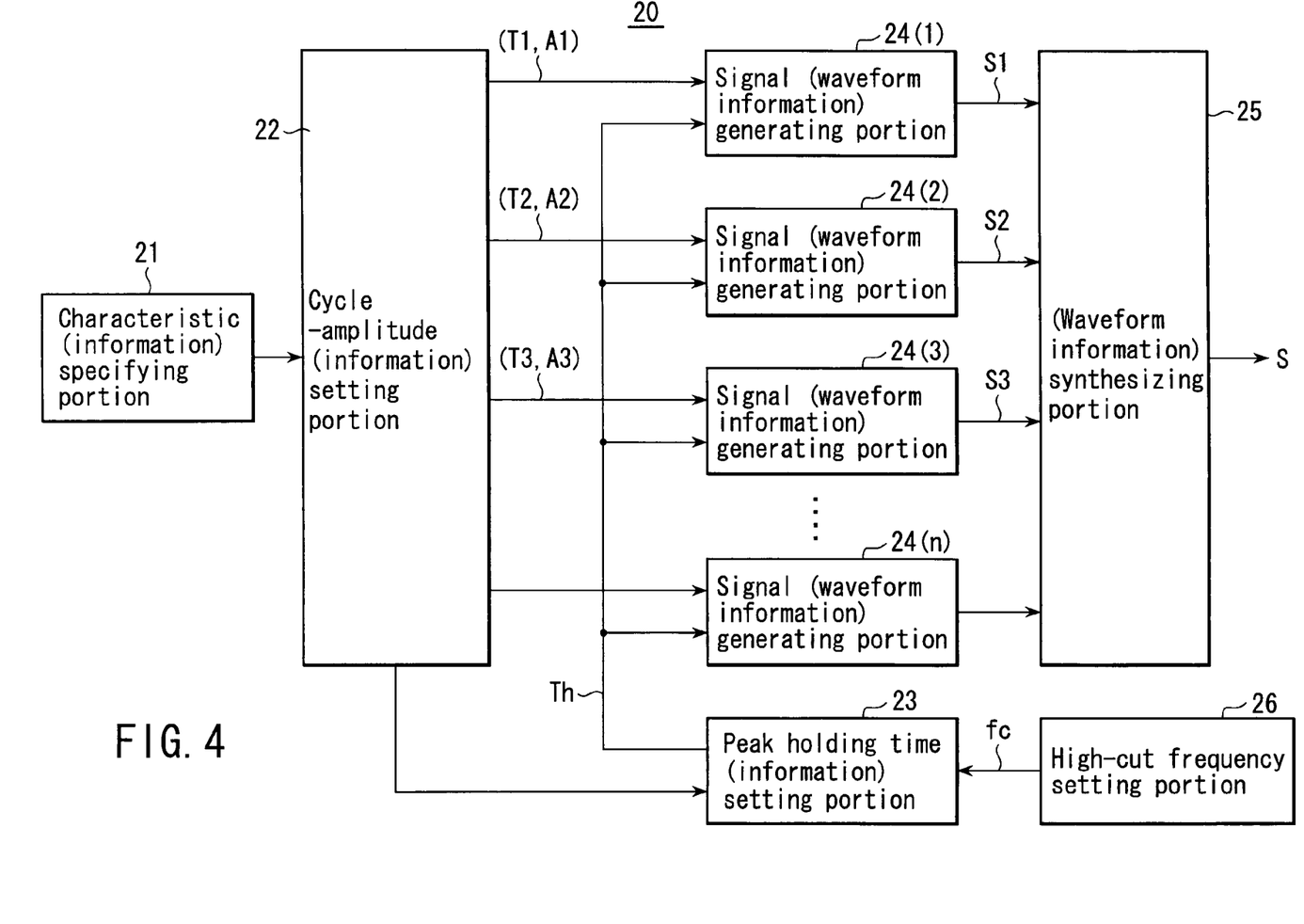
FIG. 4 is a block diagram showing the MTIE test signal generating apparatus according to a second embodiment of the present invention.

FIG. 4 is a block diagram showing the second embodiment of the MTIE test signal generating apparatus of the present invention.

Like reference numerals are attached to the same components in FIG. 4 as those of the MTIE test signal generating apparatus 20 of the first embodiment shown in FIG. 1 and description thereof is omitted.

As regards the MTIE test signal generating apparatus 20 of the first embodiment, a case where the high-cut frequency of the LPF 18a for extracting a wander of the wander measuring unit 18 has been described.

However, the MTIE test signal generating apparatus 20 of the second embodiment is applied for a case where the high-cut frequency fc of the LPF 18a for extracting a wander of the wander measuring unit 18a is variable arbitrarily.

As shown in FIG. 4, the MTIE test signal generating apparatus 20 of the second embodiment is provided with a high-cut frequency setting portion 26 which sets a high-cut frequency corresponding to a high-cut frequency fc if the high-cut frequency fc of the LPF 18a is changed to any value.

Then, the peak holding time setting portion 23 obtains a peak holding time based on high-cut frequency corresponding to the high-cut frequency fc of the LPF 18a set by the high-cut frequency setting portion 26 and sets that value in the plural signal generating portions 24(1), 24(2), ... 24(k).

Consequently, even if the high-cut frequency of the LPF 18a is changed, an optimum peak holding time can be automatically set in the plural signal generating portions 24(1), 24(2), ... 24(k) by setting the changed high-cut frequency with the high-cut frequency setting portion 26.

Alternatively, the peak holding time setting portion 23 may obtain an optimum peak holding time and set that in the plural signal generating portions 24(1), 24(2), ... 24(k) based on a cycle set by the high-cut frequency of the LPF 18a and the cycle-amplitude setting portion 22.

The MTIE test signal generating apparatus 20 of the second embodiment may be so constructed to output the waveform in which the peak value is held extendedly over a predetermined time interval from only the signal generating portion 24(1) having the shortest cycle of the plural signal generating portions 24(1), 24(2), ... 24(k), not from all the plural signal generating portions 24(1), 24(2), ... 24(k) for outputting the synthesis signals or from part of the other signal generating portions 24(2), ... 24(k) including the signal generating portion 24(1).

(Other Embodiment)

Figure 5:
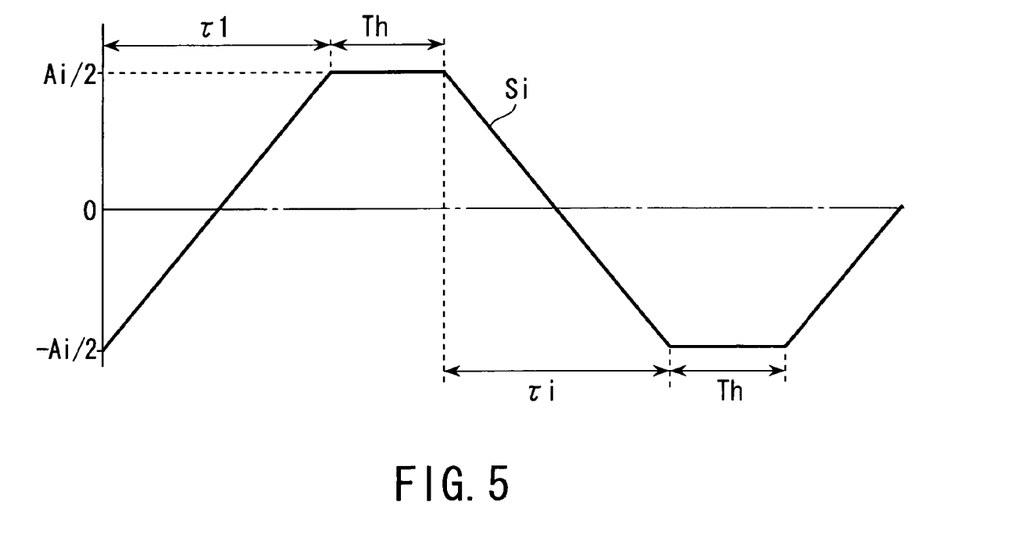
FIG. 5 is a diagram showing other signal waveform used in the MTIE test signal generating apparatus of the present invention.

FIG. 5 is a diagram showing a signal waveform used in the MTIE test signal generating apparatus according to other embodiment of the present invention.

The structure of the MTIE test signal generating apparatus of this other embodiment is the same as that of the MTIE test signal generating apparatus of the first and second embodiments shown in FIGS. 1, 4 and therefore, description thereof is omitted.

In the MTIE test signal generating apparatus 20 of the above-described first and second embodiments, a case where respective signals generated from the plural signal generating portions 24(1), 24(2), . . . 24(k) are signals in which changes in amplitude (voltage) between peak values are sine wave, substantially trapezoidal has been described.

However, in the MTIE test signal generating apparatus of this other embodiment, it is assumed that the plural signal generating portions 24(1), 24(2), . . . 24(k) (see FIGS. 1, 4) output signals in which changes in amplitude (voltage) between the peak values are substantially trapezoidal as shown in FIG. 5.

Even if the signal in which the changes in amplitude (voltage) between the peak values are linear and substantially trapezoidal is used, it is theoretically possible to acquire the same operation and effect as the MTIE test signal generating apparatus 20 of the first and second embodiments utilizing the signal in which the changes in amplitude (voltage) between the peak values are sine wave like and substantially trapezoidal.

As described above, the MTIE test signal generating apparatus of the present invention is so constructed that at least one of the plural signal generating portions outputs a signal having a waveform in which both peak values of a signal having a cycle and an amplitude set by the cycle-amplitude setting portion are held extendedly in a time interval of more than a predetermined time and the synthesizing portion synthesizes these signals so as to obtain a phase modulation signal.

Thus, at the time of measuring a wander of a test signal modulated in phase by this phase modulation signal with a wander measuring unit, a measurement error due to an influence by the LPF for extracting a wander of the wander measuring unit can be eliminated thereby achieving a highly reliable measurement.

Further, by providing a characteristic specifying portion for specifying a desired MTIE characteristic selectively from the plural MTIE characteristics, the MTIE test signal generating apparatus of the present invention can generate a phase modulation signal corresponding to an arbitrarily specified MTIE characteristic of the plural MTIE characteristics.

Further, by providing a peak holding time setting portion for setting any holding time on at least one of the plural signal generating portions, the MTIE test signal generating apparatus of the present invention can set a peak value holding time corresponding to an observation time of each specific point for the MTIE characteristic, a high-cut frequency of the LPF for extracting a wander of the wander measuring unit and the like.

Because the peak holding time setting portion sets a holding time corresponding to a cycle set by the cycle-amplitude setting portion to at least one of the plural signal generating portions, the MTIE test signal generating apparatus of the present invention can automatically set an optimum holding time corresponding to a cycle set by the cycle-amplitude setting portion.

Because a high-cut frequency setting portion for setting a high-cut frequency corresponding to a variable high-cut frequency of a low pass measuring filter used for measuring a wander in a test signal modulated in phase by the phase modulation signal is provided and the peak holding time setting portion sets a holding time corresponding to a high-cut frequency set by the high-cut frequency setting portion on at least one of the plural signal generating portions, the MTIE test signal generating apparatus of the present invention can automatically set a peak value holding time corresponding to that high-cut frequency even if the high-cut frequency of a low pass measuring filter for measuring a wander is changed.

Thus, as described above, according to the present invention, by adopting technology which prohibits a measurement error due to an influence by the high-cut filter for extracting a wander in the MTIE measuring apparatus from occurring, it is possible to provide an MTIE test signal generating apparatus capable of detecting an MTIE characteristic properly with the MTIE measuring apparatus including the wander measuring unit.

What is claimed is:

1. A Maximum Time Interval Error (MTIE) test signal generating apparatus in which a signal obtained by modulating a clock signal from a reference clock generator in terms of phase by means of a predetermined MTIE test signal is input to a maximum time interval error (MTIE) measuring unit including a low-pass measuring filter having a predetermined high-cut characteristic at an input portion thereof so as to generate the predetermined MTIE test signal which enables measurement of a predetermined MTIE characteristic based on the signal, comprising:

a cycle-amplitude setting portion which sets a cycle corresponding to an observation time of each of desired plural specific points for a predetermined MTIE characteristic of plural MTIE characteristics and an amplitude corresponding to a difference in the MTIE value between adjacent specific points of the desired plural specific points;

plural signal generating portions which generate plural signals each having a cycle corresponding to an observation time of each of the desired plural specific points and an amplitude corresponding to a difference in MTIE value between adjacent specific points of the desired plural specific points, the cycle and amplitude being set by the cycle-amplitude setting portion and having repetitive waveforms in which after the signal amplitude increases from its lower limit value to its upper limit value during each observation time, it decreases from the upper limit value to the lower limit value and then outputting to each of the desired plural specific points;

a holding time setting portion which sets a holding time for holding the upper limit value and the lower limit value of the repetitive waveform of the signal over the predetermined time so that at least a signal cycle having the shortest cycle of the plural signals generated by the plural signal generating portions is longer than a predetermined time corresponding to the predetermined high-cut characteristic of the low-pass measuring filter in the MTIE measuring unit; and a synthesizing portion which synthesizes the plural signals output from the plural signal generating portions by summing and outputting as the predetermined MTIE test signal.

2. An MTIE test signal generating apparatus according to claim 1, further comprising a characteristic specifying portion which specifies the predetermined MTIE characteristic of the plural MTIE characteristics to the cycle-amplitude setting portion.

3. An MTIE test signal generating apparatus according to claim 1, wherein the holding time setting portion sets the repetitive waveform of a signal at least having the shortest cycle in the plural signal generating portions to such a waveform in which after the signal amplitude increases monotonously from its lower limit value to its upper limit value, the upper limit value is maintained over a predetermined time and then after the signal amplitude decreases from the upper limit value to the lower limit value during the observation time after the holding time elapses, the lower limit value is maintained over the predetermined time.

4. An MTIE test signal generating apparatus according to claim 1, wherein the holding time setting portion is provided as a fixed holding time setting portion which sets the holding time to a fixed value over the predetermined time in a signal generating portion for generating a signal having at least the shortest cycle of the plural signal generating portions.

5. An MTIE test signal generating apparatus according to claim 1, wherein the holding time setting portion has a function for setting the holding time in a signal generating portion having at least the shortest cycle of the plural signal generating portions to any value over the predetermined time.

6. An MTIE test signal generating apparatus according to claim 1, wherein the holding time setting portion has a function for setting the holding time in a signal generating portion for generating a signal having at least the shortest cycle of the plural signal generating portions corresponding to a cycle set by the cycle-amplitude setting portion.

7. An MTIE test signal generating apparatus according to claim 1, further comprising a high-cut frequency setting portion which, if a high-cut frequency for specifying the predetermined high-cut characteristic of the low-pass measuring filter in the MTIE measuring unit is changed, sets a high-cut frequency corresponding to the changed high-cut frequency wherein the holding time setting portion sets the holding time corresponding to a high-cut frequency set by the high-cut frequency setting portion in a signal generating portion for generating at least the shortest cycle of the plural signal generating portions.

8. An MTIE test signal generating apparatus according to claim 1, wherein the plural signal generating portions generate plural signals having substantially sine wave like trapezoidal waveform or substantially linear trapezoidal repetitive waveforms.

9. An MTIE test signal generating apparatus according to claim 1, wherein the cycle-amplitude setting portion, the plural signal generating portions, the holding time setting portion and the synthesizing portion are constituted of a digital signal processor and the predetermined MTIE test signal is created and output by the digital signal processor.

10. An MTIE test signal generating apparatus according to claim 9, wherein as a phase modulator for modulating the clock signal from the reference clock generator in terms of phase with the predetermined MTIE test signal created and output by the digital signal processor, a direct digital synthesizer is employed.

11. A Maximum Time Interval Error (MTIE) test signal generating apparatus in which a signal obtained by modulating a clock signal from a reference clock generator in terms of phase by means of a predetermined MTIE test signal is input to a maximum time interval error (MTIE) measuring unit including a low-pass filter having a predetermined high-cut characteristic at an input portion thereof so as to generate the predetermined MTIE test signal which enables measurement of a predetermined MTIE characteristic based on the signal, comprising:

a cycle-amplitude information setting portion which sets cycle information corresponding to an observation time of each of desired plural specific points about a desired MTIE characteristic of plural MTIE characteristics and amplitude information corresponding to a difference in MTIE value between adjacent specific points of the desired plural specific points;

plural signal waveform information generating portions which generates waveform information about plural signals having such a repetitive waveform in which after a signal amplitude increases form its lower limit value to its upper limit value during the each observation time, the signal amplitude decreases from the upper limit value to the lower limit value, based on cycle information corresponding to an observation time of each of the desired plural specific points set by the cycle-amplitude information setting portion and amplitude information corresponding to a difference in MTIE value between adjacent specific points of the desired plural specific points and outputs to each of the desired plural specific points;

a holding time information setting portion which sets holding time information for holding the upper limit value and the lower limit value of the signal repetitive waveform for over the predetermined time so that the cycle of a signal having at least the shortest cycle in waveform information of the plural signals generated from the plural signal waveform information generating portions is longer than a predetermined time corresponding to the predetermined high-cut characteristic of the low-pass measuring filter in the MTIE measuring unit; and a waveform information synthesizing portion which synthesizes the plural signal waveform information output from the plural signal waveform generating portions by summing so as to create and output the predetermined MTIE test signal.

12. An MTIE test signal generating apparatus according to claim 11, wherein the cycle-amplitude setting portion, the plural signal generating portions, the holding time setting portion and the synthesizing portion are constituted of a digital signal processor and the predetermined MTIE test signal is created and output by the digital signal processor.

13. An MTIE test signal generating apparatus according to claim 12, wherein as a phase modulator for modulating the clock signal from the reference clock generator in terms of phase with the predetermined MTIE test signal created and output by the digital signal processor, a direct digital synthesizer is employed.

14. A Maximum Time Interval Error (MTIE) test signal generating method in which a signal obtained by modulating a clock signal from a reference clock generator in terms of phase by means of a predetermined MTIE test signal is input to a maximum time interval error (MTIE) measuring unit including a low-pass filter having a predetermined high-cut characteristic at an input portion thereof so as to generate the predetermined MTIE test signal which enables measurement of a predetermined MTIE characteristic based on the signal, comprising:

setting a cycle corresponding to an observation time of each of desired plural specific points for a predetermined MTIE characteristic of plural MTIE characteristics and an amplitude corresponding to a difference in the MTIE value between adjacent specific points of the desired plural specific points;

generating plural signals each having a cycle corresponding to an observation time of each of the desired plural specific points and an amplitude corresponding to a difference in MTIE value between adjacent specific points of the desired plural specific points and having repetitive waveforms in which after the signal ampli tude increases from its lower limit value to its upper limit value during the each observation time, it decreases from the upper limit value to the lower limit value and then outputting to each of the desired plural specific points;

setting a holding time for holding the upper limit value and the lower limit value of the repetitive waveform of the signal over the predetermined time so that a signal cycle having at least the shortest cycle when the plural signals are generated is longer than a predetermined time corresponding to the predetermined high-cut characteristic of the low-pass measuring filter in the MTIE measuring unit; and synthesizing the plural signals by summing and outputting as the predetermined MTIE test signal.

15. An MTIE test signal generating method according to claim 14, further comprising specifying the desired MTIE characteristic from the plural MTIE characteristics.

16. An MTIE test signal generating method according to claim 14, wherein setting of the holding time is executed by setting the holding time to a fixed value over the predetermined time when a signal having at least the shortest cycle is generated.

17. An MTIE test signal generating method according to claim 14, wherein setting of the holding time is executed by setting the holding time to any value over the predetermined time when a signal having at least the shortest cycle is generated.

18. An MTIE test signal generating method according to claim 14, wherein setting of the holding time is executed by setting the holding time corresponding to a cycle set at the time of setting the cycle when a signal having at least the shortest cycle is generated.

19. An MTIE test signal generating method according to claim 14, further comprising when a high-cut frequency for specifying the predetermined high-cut characteristic of the low-pass measuring filter of the MTIE measuring unit is changed, setting a high-cut frequency corresponding to the changed high-cut frequency, wherein setting of the holding time is executed by setting the holding time corresponding to a high-cut frequency set by the high-cut frequency when a signal having at least the shortest cycle is generated.

20. An MTIE test signal generating method according to claim 14, wherein generation of the plural signals is to generate plural signals having substantially sine wave like trapezoidal waveform or substantially linear trapezoidal repetitive waveforms.

* * * * *